United States Patent Office 3,399,839
Patented Sept. 3, 1968

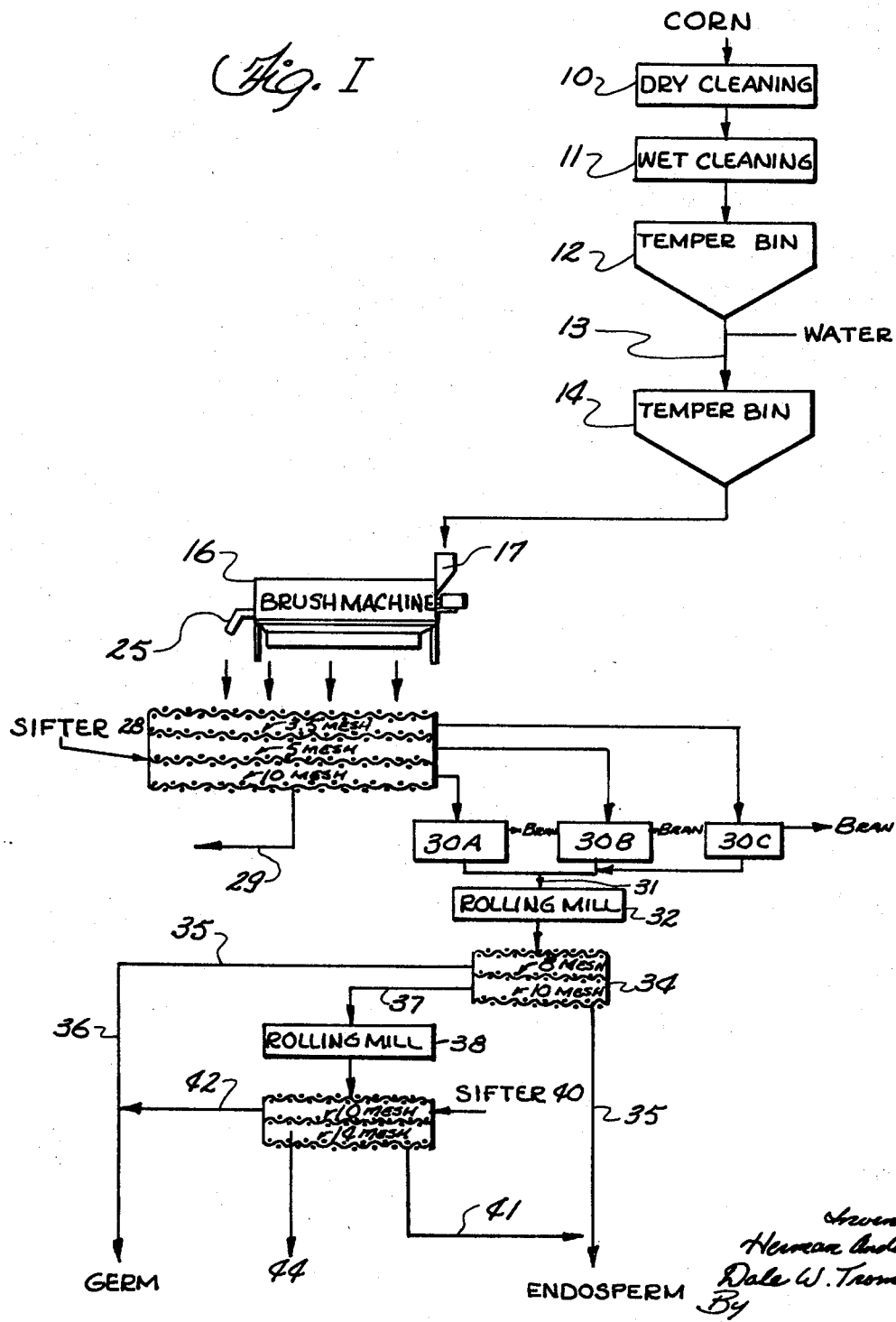

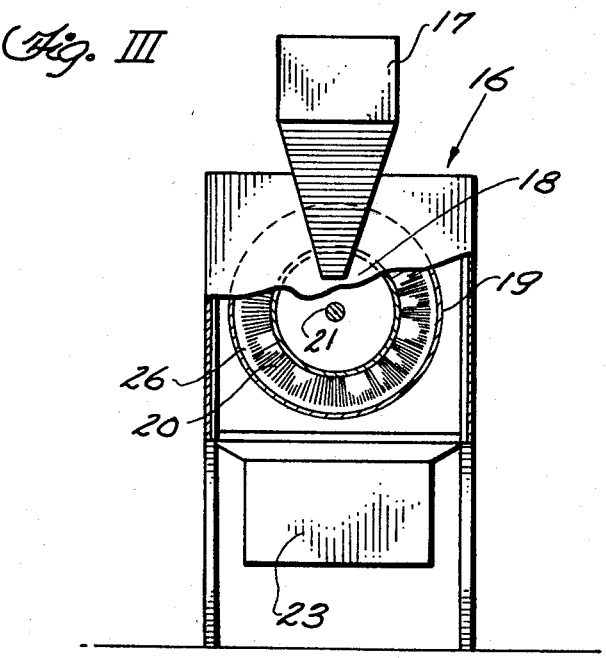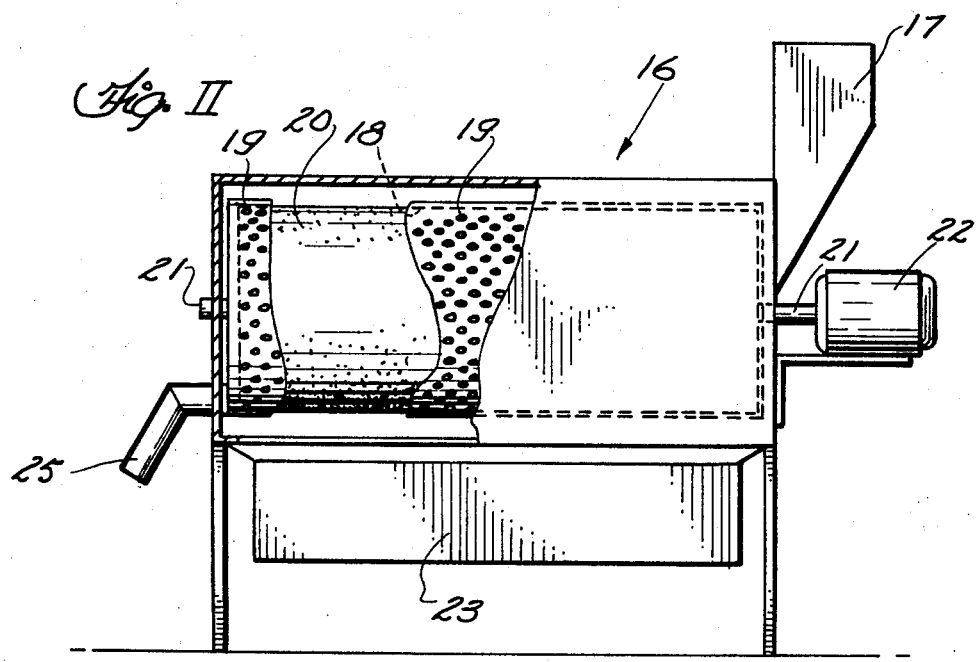

3,399,839
DRY MILLING CORN PROCESS
Herman Anderson and Dale W. Trommer, Algonquin, Ill., assignors to The Quaker Oats Company, Chicago, Ill., a corporation of New Jersey
Filed Mar. 2, 1964, Ser. No. 348,703
13 Claims. (Cl. 241—11)

This invention relates to improvements in the manufacture of dry milled corn products. More particularly, this invention relates to improvements in the milling of corn whereby optimum yield of desired corn products are obtained in a simple, efficient and economical manner.

The general purpose of corn milling processes is to separate various components of the corn kernel, namely the germ, the endosperm, the hull (bran) and the tip cap. There is wide variation in dry corn milling processes, depending upon such factors as the nature of the corn, ratio of products desired, consumer preferences and the like. Nevertheless, these corn milling processes generally involve subjecting the corn to various cleaning operations followed by washing the corn in water. Prior to the washing operation, the corn kernels are ordinarily cleaned to remove dust, chaff, broken grain particles, stray metallic objects and other extraneous materials which may be found with the corn. Various means are employed to clean the corn, such as air blasts, magnetic and electrostatic separators, screens and the like. After dry cleaning, the corn can be further subjected to wet cleaning operations or tempering operations.

Tempering or conditioning involves the adjusting of moisture within the various portions or components of the grain. Hence, some tempering takes place during the washing operation. Usually the wet corn from the watering device is whizzed to remove excess surface water and then is transferred to tempering bins for varying periods of time. Here "tempering" continues in that the remaining surface water tends to be absorbed into the kernel and the water which has already entered the kernel diffuses to further change the water level in the varying portions of the kernel.

After tempering, the corn is subjected to a relatively large number of milling and screening operations to effect separation of the various corn products desired. These operations generally involve a complex series of grinding, drying and screening steps in order to achieve satisfactory recovery of desired corn products. Generally, in modern corn milling practice, the yield of endosperm should be above about 60% and many milling and screening steps are generally required to accomplish this result. It is therefore a primary object of the present invention to provide a corn milling process in which the various desired corn products are obtained in high yield with significant reduction in the number of processing steps.

A further principal object of the invention is to provide a corn milling process in which desired corn products are obtained quickly, efficiently and economically.

Another object of the present invention is to provide a corn milling process in which the extent of corn drying is significantly reduced.

A still further object of the invention is to provide a corn milling process wherein substantially complete removal of hulls is accomplished early in the corn processing sequence in novel manner by means of a rotary wire brush.

The general object of the present invention is to provide an improved corn milling process.

A further specific object of the present invention is to provide a process for producing pearled corn from which grits, corn meal and corn flour having low fat content can be produced.

Another specific object of the present invention is to provide a corn milling process which produces a germ fraction essentially free of bran and endosperm and which is high in fat content.

A still further specific object of the present invention is to provide a corn milling process which produces an endosperm fraction which is essentially free of bran and germ.

The corn milling process of the present invention and the advantages thereof will become further apparent from the following description taken in conjunction with the accompanying drawings in which:

FIGURE I is a flow sheet illustrating a presently preferred embodiment of the process of the invention.

FIG. II is a side elevational view partly in section illustrating apparatus equipped with rotary wire brushes which is admirably adapted for removing corn hulls.

FIG. III is an elevational front partially sectioned view of the apparatus shown in FIG. II.

In accordance with the present invention, corn, preferably after being suitably cleaned by either dry or wet processing or both, is treated to adjust its moisture content to within a fairly narrow and critical range of from about 19 to about 23% by weight, preferably 19 to 21%. The moisture adjustment is carried out in two steps, the moisture being adjusted in the first step to within the range from about 15 to 17% and in the second step to a final moisture content of from about 19 to about 23%. Proper adjustment of the moisture content involves not only the absolute moisture content but also the distribution of moisture throughout the corn kernels. In the initial moisture adjustment step the moisture is permitted to substantially equilibriate throughout the corn kernel. In the second moisture adjustment step, penetration of the moisture is restricted substantially to the hull and the germ layer of the corn kernels by controlling the time during which diffusion of the moisture takes place.

After proper adjustment of the moisture content, the wet corn is transferred to a brushing apparatus wherein rotary wire brushes effect substantially complete detachment of the hulls from the germ and endosperm components of the corn kernel. Proper adjustment of the moisture content and subsequent treatment by means of the rotary wire brushes are essential and unique features of the present invention which directly contribute to the overall processing advantages. We have found that the moisture content of and moisture distribution in the corn at the time of contact with the rotary wire brushes is relatively critical and must be within the prescribed range.

Referring to FIG. I of the drawings, raw corn is subjected to various dry cleaning operations at 10 to remove extraneous materials therefrom. This dry cleaning of the corn can involve a number of different operations and involve the use of magnets, air currents, electrostatic separators and the like, all as are well known in the art. The dry cleaning of the corn can be followed, if necessary, by wet cleaning operations at 11 utilizing wet stoners, floaters, washers, whizzers and the like, which are also known to the art. Following the above preconditioning or cleaning of the corn, the moisture content of the corn is adjusted in accordance with the invention to within the critical range of from about 19 to 23% by weight, preferably 19 to 21%. The moisture adjustment is effected in two steps as indicated on the drawing. The corn from wet cleaning operation 11 is passed into temper bin 12 and is maintained therein for a period of time ranging from about 30 minutes up to several hours or more to permit equilibriation of the moisture content of the corn to within the range from about 15 to 17% by weight. If the corn feed, i.e. corn starting material, already contains 15 to 17% moisture, as may be present in new crop corn, the initial moisture adjustment step is not necessary. The corn is then passed through line 13 to the second temper bin 14. Additional water is added to the corn, usually within line 13, to increase its moisture content to within the range from about 19 to 23%. Hot or cold water can be introduced into line 13 for this purpose.

It is important that the moisture absorption of the corn during the second temper be accurately monitored so that upon attaining the desired moisture distribution the corn can, without a substantial time lag, be transferred to the brush machine 16. The corn is normally maintained in temper bin 14 for relatively short periods, so that the time lapse from the addition of the second temper water until brushing usually ranges from about 3 or 4 minutes and does not exceed about 10 minutes so as to prevent the moisture from leaving the bran and going into the endosperm. The particular nature of the corn, the temperature of the water in tempering bin 14 and so forth affect the absorption time. The residence time of the corn in temper bin 14 can be determined with accuracy by visual observation of the disappearance of the surface water from the hull surface. This is a good criterion for determining when the corn should be fed into the brush machine. As soon as the surface water film disappears, as determined from visual inspection, the corn is fed into the brush machine 16. The time lag at this stage of processing is very important and a delay of more than about 5 minutes after disappearance or absorption of the surface water is preferably avoided. This is in contrast to prior art corn milling processes wherein tempered corn is transferred to surge bins prior to debranning operations with time lags of anywhere from 20 to 30 minutes or more occurring between the tempering and debranning operations.

The properly tempered corn is introduced into the brush machine 16 through hopper 17 and passes into the inner chamber 18 of the brush machine defined by means of a perforated cylindrical screen 19. The perforations in the screen 19 can vary in size, for example from about $12/64$ inch to about $18/64$ inch. A wire brush 20 is disposed within the cylindrical perforated screen 19 on shaft 21 and is adapted for relatively high speed rotation, such as for example 950 to 1700 r.p.m., by means of motor 22. The brush 20 can comprise one homogeneous wire brush of the desired length and diameter or may be a series of brushes end to end on a common shaft in which case wide gaps between the various brushes are to be avoided. The brush 20 is of such diameter as to provide a space 26 between the periphery thereof and the perforated screen 19. The principal purpose of the brush machine is to detach the hull. In general, clearances from about ½ inch to ¾ inch are suitable. The brush 20 can be mounted with the axis extending either horizontal, inclined to the horizontal, or vertical. The wet corn having a moisture content within the critical range is brought into contact with the brush for short periods, such as one or two minutes, by charging it into the inner chamber 18 defined by the perforated screen 19. The rotating action of the brush 20 effects removal of the hull from the corn with the hull particles being caught by the periphery of the brush and hurled tangentially therefrom at high speed against the perforated screen 19. The rotating action of the brush effects detachment of the hull from the endosperm and germ if the tempering is carried out in accordance with this invention. Most of the hull is abraded and detached from the germ and endosperm. The abrading action of the brush also causes some of the endosperm and germ to become fines. The fines, hull, endosperm and germ particles leave the chamber 18 by way of the perforated screen 19 and are removed from the brush machine through fine discharge outlet 23. The remaining kernels are broken up by the action of the brush 20, by impact with other kernels and by impact with the perforated screen 19. The kernels retained by the screen 19 are eventually discharged from brush machine 16 through coarse discharge 25. When corn having the prescribed critical tempering treatment is subjected to the action of the rotating wire brush 20, substantially complete debranning or detachment of the hull is accomplished. At the same time, the moisture levels of the germ and endosperm are such that simplified separation of these fractions can be readily accomplished in subsequent conventional rolling and screening operations. Before rolling and screening, however, the detached hull is separated by aspiration. Various conventional pearlers or degerminators can be modified to perform the brushing operation.

The fines and coarse discharge from brush machine 16 are conveyed to a sifter 28 which, as shown, is preferably provided with a number of screens of optional mesh sizes, for example the upper screen being 3½ mesh, the next screen being 5 mesh and the lower screen 10 mesh. This screening operation involves essentially the removal of small fines such as, for example, material smaller than 10 mesh, which is removed from the system via line 29 and which can be used for stock feeds and the like. While it is preferable to employ a plurality of screens in sifter 28, it is not necessary to do so and the products from the brush machine 16 can be divided only into two main fractions, one fraction having a particle size greater than 10 mesh and the other fraction a particle size of less than 10 mesh, although this size separation can be varied depending upon the desires of the operator.

The overs from sifter 28, that is all material of a particle size greater than 10 mesh, are conveyed to an aspirator which may be any standard aspirating equipment. The essential feature of this processing step is to separate by aspiration bran from the process stream leaving the mixed endosperm and germ components for further processing. For optimum efficiency of separation of bran in a large scale operation, it is preferred to employ a plurality of screens in sifter 28 as indicated and to employ separate aspirators 30a, 30b and 30c for each fraction although a single aspirator could be employed.

In this preferred operation the aspirated germ and endosperm are then combined and passed through line 31 to a rolling mill 32 for reduction and comminution. Conventional roller mills can be used for this operation, the purpose of this being to flatten the ductile germ and pulverize the more fragile endosperm. The spacing between the rollers in mill 32 is not critical, but can be varied and can range, for example, from 0.04 to 0.05 inch. The tempering sequence previously described, which is a critical feature of the present invention, renders the germ ductile while leaving the endosperm fragile. Accordingly, the germ does not rupture as a result of the rolling treatment, but flattens out while the majority of the fragile endosperm is broken in this rolling mill treatment to a smaller particle size. Thus, the endosperm and germ can be readily separated by screening.

After roller milling at 32, the material is subjected to a second screening in sifter 34, which is provided, for example, with 8 and 10 mesh screens. The finest material which passes the 10 mesh screen is substantially pure endosperm and is removed via line 35. The material which is retained on the 8 mesh screen is substantially germ and is removed from the system via line 36. The material of smaller particle size, namely the material retained on the 10 mesh screen, comprises a mixture of germ and endosperm and is conveyed via line 37 to a second rolling mill unit 38 which preferably operates with closer spacing between the rollers. This spacing too is variable and can, for example, be from about 0.02 inch to 0.25 inch. The purpose of this rolling operation 38 is similar to that of the first rolling operation 32, that is to flatten the smaller germ particles and pulverize the smaller endosperm particles to effect further separation of the germ and endosperm. Thus, after rolling at 38, the material is subjected to a further screening in sifter 40 which is provided with a plurality of screens of increasingly finer mesh size, such as, for example, 10 and 14 mesh (standard mill). The material which passes through the 14 mesh screen is removed via line 41 and combined with the endosperm while the overs from the 10 mesh screen are germ and are removed via line 42 to be combined with the germ previously obtained. The material which is retained in the 14 mesh screen is a relatively small portion of the corn (generally only about 1.5%) and is removed via line 44. This can be utilized as stock feed and the like. In common practice, between 60 and 65% of the corn endosperm is recovered.

The above description illustrates in general a preferred embodiment of the process of the present invention. Utilizing the above procedure, the relative amounts and analysis of the various components obtained in a corn milling run is given below:

TYPICAL AMOUNTS AND ANAYLSIS OF COMPONENTS

| Product | Amount, Percent | Mositure, Percent | Fat, Percent | Fiber, Percent | Starch, Percent | Protein, Percent |
|---|---|---|---|---|---|---|
| Bran | 4.84 | 25.4 | 1.4 | 10.6 | 27.4 | 8.1 |
| Germ | 10.23 | 16.4 | 22.6 | 3.3 | 16.6 | 15.7 |
| Endosperm | 64.12 | 15.2 | 1.1 | .53 | 75.2 | 7.1 |
| Unseparated | 1.20 | 15.4 | 7.0 | 1.5 | 56.6 | 10.6 |
| −10 wire 1st sifter | 19.61 | 26.0 | 1.5 | 3.5 | 47.0 | 8.8 |

Those modifications and equivalents which fall within the spirit of the invention and the scope of the appended claims are to be considered part of the invention.

We claim:

1. In a process of milling corn to separate bran, germ and endosperm components of the corn, the improvement which consists in adjusting in increments the moisture content of the corn to within the range from about 19 to about 23% by weight, and then without substantial time lag subjecting the corn to the abrading action of a wire brush so as to remove bran from the corn.

2. In a process for milling corn to separate bran, germ and endosperm components of the corn, the improvement which consists in adjusting in increments the moisture content of the corn to within the range from about 19 to about 23% by weight and then within about five minutes after disappearance of the surface moisture subjecting the so-moistened corn to the abrading action of a wire brush so as to remove bran from the corn.

3. In a process for milling corn to separate bran, germ and endosperm components of the corn, the improvement which consists in first adjusting the moisture content of the corn to within the range from about 15 to 17% by weight and finally adjusting the moisture content of the corn to within the range from about 19 to about 23% by weight and then within about five minutes after disappearance of the surface moisture subjecting the so-moistened corn to the abrading action of a wire brush so as to remove bran from the corn.

4. A process of milling corn which comprises the steps of adjusting in increments the moisture content of the corn to within the range from about 19 to about 23% by weight, then subjecting without substantial time lag the so-moistened corn to the abrading action of a wire brush so as to remove bran from the corn, separating bran from the remaining components of the corn, roll milling the last-mentioned corn components to effect a size separation of germ and endosperm, and recovering the said separated germ and endosperm components.

5. A process of milling corn which comprises the steps of adjusting in increments the moisture content of the corn to within the range from about 19 to about 23% by weight, then within about five minutes after disappearance of the surface moisture subjecting the so-moistened corn to the abrading action of a wire brush so as to remove bran from the corn, separating bran from the remaining components of the corn, roll milling the last-mentioned corn components to effect a size separation of germ and endosperm, and recovering the said separated germ and endosperm components.

6. A process of milling corn which comprises the steps of first adjusting the moisture content of the corn to within the range from about 15 to about 17% by weight and finally adjusting the moisture content of the corn to within the range from about 19 to about 23% by weight, then within about five minutes after disappearance of the surface moisture subjecting the so-moistened corn to the abrading action of a wire brush so as to remove bran from the corn, separating bran from the remaining components of the corn, roll milling the last-mentioned corn components to effect a size separation of germ and endosperm, and recovering the said separated germ and endosperm components.

7. A process of milling corn which comprises the steps of adjusting in increments the moisture content of the corn to within the range from about 19 to about 23% by weight, subjecting without substantial time lag the so-moistened corn to the abrading action of a wire brush so as to remove bran, grading the corn particles resulting from said abrading treatment to obtain at least a particle size fraction of less than about 10 mesh and a particle size fraction of greater than about 10 mesh, separating from the system the said fraction having a particle size of less than about 10 mesh, separating bran from the said fraction having a particle size greater than about 10 mesh, thereafter roll milling the last-mentioned fraction from which bran has been removed to effect a size separation of germ and endosperm and recovering said separated germ and endosperm components.

8. A process of milling corn which comprises the steps of first adjusting the moisture content of the corn to within the range from about 15 to about 17% by weight and finally adjusting the moisture content of the corn to within the range from about 19 to about 23% by weight, then within about five minutes after disappearance of the surface moisture subjecting the so-moistened corn to the abrading action of a wire brush so as to remove bran, grading the corn particles resulting from said abrading treatment to obtain at least a particle size fraction of less than about 10 mesh and a particle size fraction of greater than about 10 mesh, separating from the system the said fraction having a particle size of less than about 10 mesh, separating bran from the said fraction having a particle size greater than about 10 mesh, thereafter roll milling the last-mentioned fraction from which bran has been removed to effect a size separation of germ and endosperm and recovering said germ and endosperm components.

9. A process of milling corn which comprises the steps of adjusting in increments the moisture content of the corn to within the range from about 19 to about 23% by weight, subjecting without substantial time lag the so-moistened corn to the abrading action of a wire brush so as to remove bran, grading the corn particles resulting from said abrading treatment to obtain at least a particle size fraction of less than about 10 mesh and a particle size fraction of greater than about 10 mesh, separating bran from the said fraction having a particle size greater than about 10 mesh, thereafter roll milling the last-mentioned fraction from which bran has been removed, grading by size the rolled granules to separate a relatively large particle size germ fraction, a relatively small particle size endosperm fraction and a middling fraction, subjecting the said middling fraction to a further roll milling operation, grading the granules resulting from the last-mentioned roll milling operation to obtain a relatively large size germ fraction and a relatively small size endosperm fraction and recovering said last-mentioned germ and endosperm fractions.

10. A process of milling corn which comprises the steps of first adjusting the moisture content of the corn to within the range from about 15 to about 17% by weight and finally adjusting the moisture content of the corn to within the range from about 19 to about 23% by weight, then within about five minutes after disappearance of the surface moisture subjecting the so-moistened corn to the abrading action of a wire brush so as to remove bran, grading the corn particles resulting from said abrading treatment to obtain at least a particle size fraction of less than about 10 mesh and a particle size fraction of greater than about 10 mesh, separating bran from the said fraction having a particle size greater than about 10 mesh, thereafter roll milling the last-mentioned fraction from which bran has been removed, grading by size the rolled granules to separate a relatively large particle size germ fraction, a relatively small particle size endosperm fraction and a middling fraction, subjecting the said middling fraction to a further roll milling operation, grading the granules resulting from the last-mentioned roll milling operation to obtain a relatively large size germ fraction and a relatively small size endosperm fraction and recovering said last-mentioned germ and endosperm fractions.

11. A process of milling corn which comprises the steps of adjusting in increments the moisture content of the corn to within the range from about 19 to about 23% by weight, subjecting without substantial time lag the so-moistened corn to the abrading action of a moving brush so as to remove bran, grading the corn particles resulting from said abrading treatment to obtain a particle size fraction of less than about 10 mesh and a plurality of particle size fractions greater than about 10 mesh, separating from the system the said fraction having a particle size of less than about 10 mesh, aspirating bran from the said plurality of fractions having a particle size greater than about 10 mesh, thereafter roll milling the said last-mentioned fractions from which bran has been removed to effect a size separation of germ and endosperm and recovering said separated germ and endosperm components.

12. A process of milling corn which comprises the steps of first adjusting the moisture content of the corn to within the range from about 15 to about 17% by weight and finally adjusting the moisture content of the corn to within the range from about 19 to about 23% by weight, then within about five minutes after disappearance of the surface moisture subjecting the so-moistened corn to the abrading action of a wire brush so as to remove bran, grading the corn particles resulting from said abrading treatment to obtain a particle size fraction of less than about 10 mesh and a plurality of particle size fractions greater than about 10 mesh, separating from the system the said fraction having a particle size of less than about 10 mesh, aspirating bran from the said plurality of fractions having a particle size greater than about 10 mesh, thereafter roll milling the said last-mentioned fractions from which bran has been removed to effect a size separation of germ and endosperm and recovering said separated germ and endosperm components.

13. A process of milling corn which comprises the steps of first adjusting the moisture content of the corn to within the range from about 15 to about 17% by weight, then finally adjusting the moisture content of the corn to from about 19 to about 23% by weight, subjecting the so-moistened corn within about five minutes after disappearance of the surface moisture from the corn to the abrading action of a wire brush so as to remove bran, screening the corn particles resulting from said abrading treatment to obtain a particle size fraction which passes a 10 mesh screen, a particle size fraction which is retained on a 10 mesh screen but passes a 5 mesh screen, a particle size fraction which is retained on a 5 mesh screen but passes a 3.5 mesh screen, and a particle size fraction which is retained on a 3.5 mesh screen, separating from the system the said fraction having a particle size of less than about 10 mesh, separating bran from the said fractions having a particle size greater than about 10 mesh, thereafter roll milling the last-mentioned fractions from which bran has been removed, screening the particles resulting from the last-mentioned roll milling operation to obtain a particle size fraction passing a 10 mesh screen, a particle size fraction which is retained by a 10 mesh screen but passes an 8 mesh screen, and a particle size fraction retained by an 8 mesh screen, separating said last-mentioned fractions, subjecting the fraction passing the 8 mesh screen but retained by the 10 mesh screen to a further roll milling operation, grading the granules resulting from the last-mentioned roll milling operation to obtain a relatively large size germ fraction and a relatively small size endosperm fraction and recovering said last-mentioned germ and endosperm fractions.

References Cited
UNITED STATES PATENTS

| | | | |
|---|---|---|---|
| 791,473 | 6/1905 | Kellog | 146—221.8 |
| 2,347,215 | 4/1944 | Pattee | 241—8 |
| 2,530,272 | 11/1950 | Thrasher | 241—7 |
| 2,879,004 | 3/1959 | Dodds | 241—7 |

WILLIAM W. DYER, Jr., *Primary Examiner.*

W. D. BRAY, *Assistant Examiner.*